United States Patent

[11] 3,589,088

[72] Inventor Otto Seidl
 Neubiberg, Germany
[21] Appl. No. 791,065
[22] Filed Jan. 14, 1969
[45] Patented June 19, 1971
[73] Assignee Dyckerhoff & Widmann
 Kommanditgesellschaft
 Munich, Germany
[32] Priority Jan. 16, 1968
[33] Germany
[31] P 16 84 643.8

[54] PRESSURE CONTAINER OF PRESTRESSED CONCRETE
 10 Claims, 7 Drawing Figs.
[52] U.S. Cl. .................................................. 52/224,
 52/80, 52/249, 176/87, 264/228
[51] Int. Cl. .................................................. G21c 13/08,
 B28b 23/08, E04c 3/10
[50] Field of Search ........................................ 264/32,
 228; 176/87, DIG. 2; 52/194, 80, 224, 248, 249

[56] References Cited
 UNITED STATES PATENTS
 3,260,020 7/1966 Patin .......................... 52/224 X
 3,286,419 11/1966 Eriksson ..................... 52/225
 3,390,211 6/1968 Ziegler ....................... 52/224 X
 3,454,080 7/1969 Kunzli ........................ 52/249 X
 FOREIGN PATENTS
 1,488,867 6/1967 France ....................... 176/87

Primary Examiner—Alfred C. Perham
Attorney—Robert H. Jacob

ABSTRACT: A pressure container for a nuclear reactor made of prestressed concrete in which annular prestressing elements are disposed in spaced relation proximate the inner wall of a concrete casing and extend circumferentially thereof and radial prestressing elements extend transversely of the annular elements and are secured thereto so that, when the radial elements are tightened or stressed, outwardly directed pressure is applied to the annular elements which are thereby expanded and prestressed.

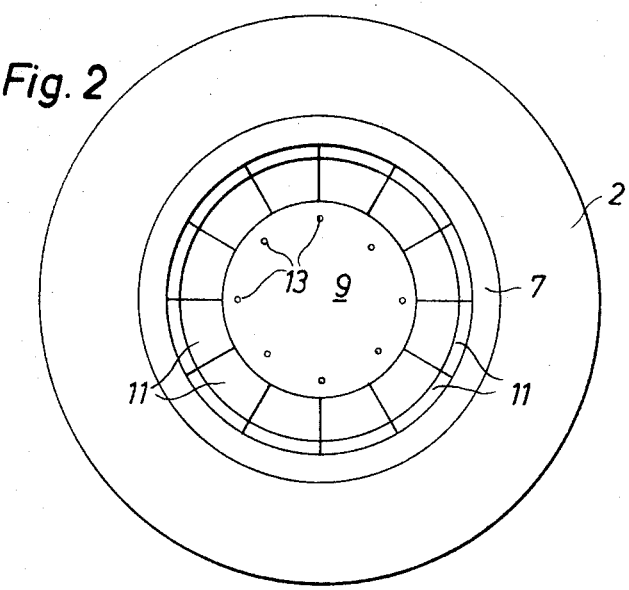
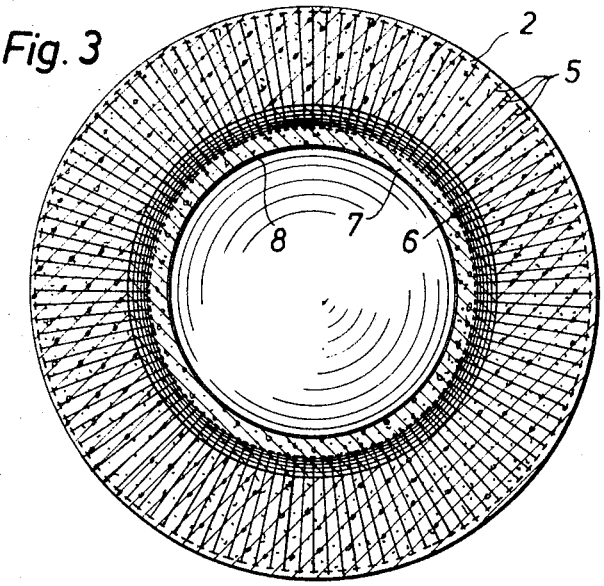

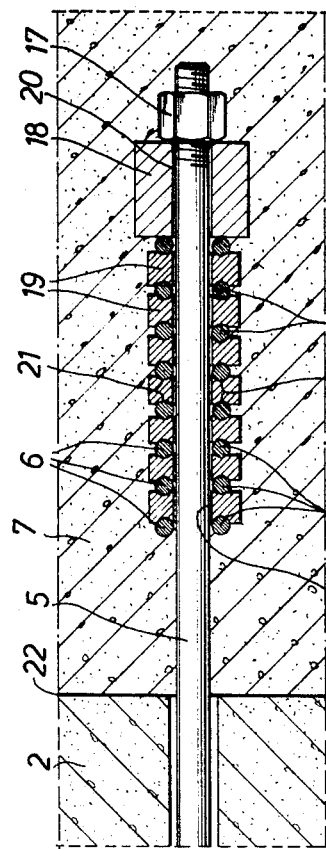
Fig. 6
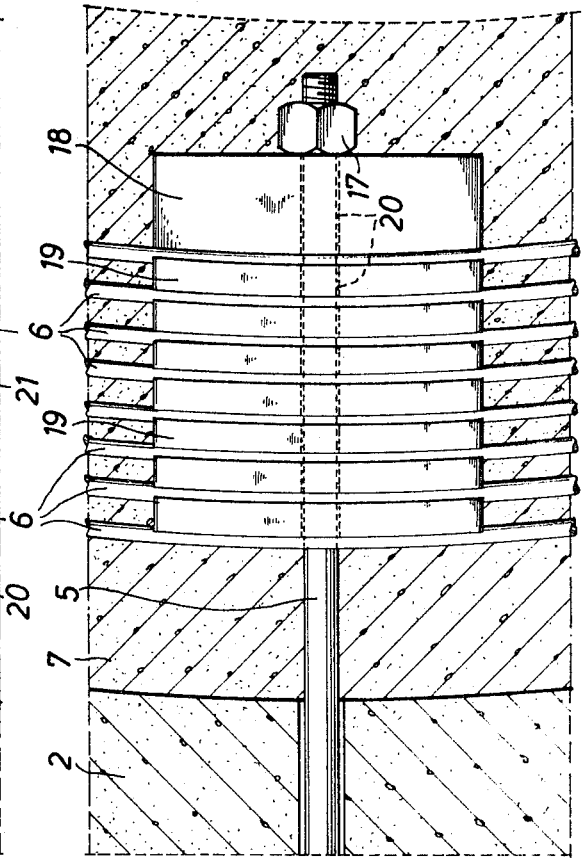
Fig. 7
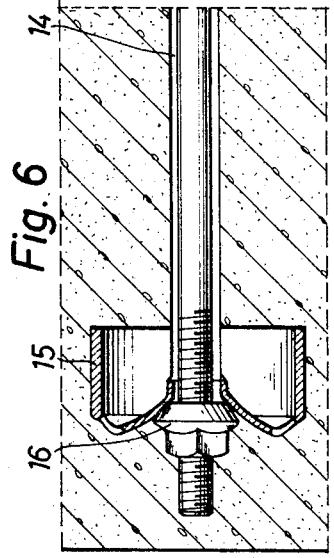
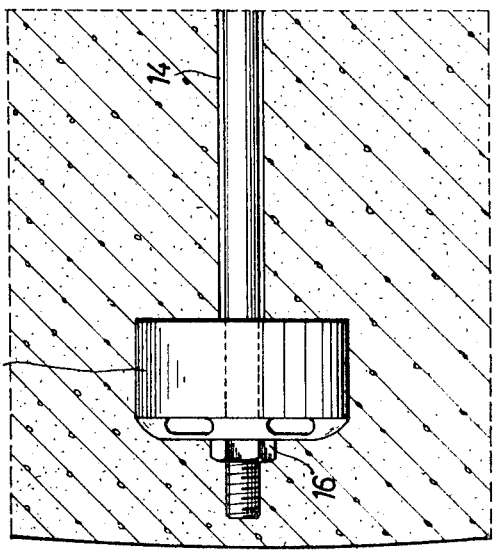
INVENTOR.
Otto SEIDL
BY Robert H. Jacob.

PRESSURE CONTAINER OF PRESTRESSED CONCRETE

BACKGROUND OF THE INVENTION

The present invention relates to pressure containers made of concrete. More in particular the invention is concerned with a pressure container made of prestressed concrete, especially for an atomic pile or nuclear reactor, which is of generally circular cross section and has a straight line and/or curvilinear generatrix, and where the annular tension elements or rods are disposed along a surface of a casing, are tensioned in radial direction and concreted in tensioned or stressed condition.

It is known in the construction of such pressure containers to construct a cylindrical container in circular fashion from prefabricated concrete elements and to place the annular prestressing elements around the rings made of prefabricated parts. The annular tension members are then put under tension by expanding the rings made of prestressing parts by means of radially effective presses that are supported against a central core disposed in the interior of the container. Thereupon the intermediate spaces that form during the expanding between the prefabricated parts are filled with concrete, the annular tension members are covered with or embedded in concrete and after setting of the concrete the forces of the presses are released, thus prestressing the wall of the cylinder by the elastic back spring or resilience of the tension elements.

This method, which is suitable for any type of reactor, even for those having relatively high pressures, requires special presses, however, the forces of which must in addition be of greater proportions by a certain amount, to take into consideration the compacting of the concrete. The pressures of the presses must be kept constant during the concreting of the gaps or spaces between the finished components and during the hardening time of the concrete. Failure or break down of individual presses during this time can result in extremely undesirable and inconvenient decreases in the forces of compression. In addition to this, upwardly directed forces can arise even with slight eccentricities of the presses which are effective outwardly, which can result in tilting of individual prefabricated structural components or of the entire ring. A further shortcoming resides in the fact that with pressure containers of considerable structural height the core that weighs 400—500 metric tons (400,000—500,000 kg.), which serves as a counterbearing for the outwardly acting presses, has to be lifted or raised over scaffolding and presses from one ring to the next as required by the annular construction of the container. It is therefore an object of the invention to provide a configuration for a pressure container made of prestressed concrete which avoids the shortcomings of the known container. For this, above all, the eccentricities that lead to undesirable side effects are to be eliminated and it is to be made possible to waive the application of complicated and expensive special presses as much as possible.

In accordance with the invention the annular tension members are arranged in concentric rings inside a thick-walled pressure casing of concrete and at a distance therefrom and for tensioning the annular members in the pressure casing radially disposed tension members or radial tenons are arranged in the pressure casing and tensioning members which are movable longitudinally relative thereto are provided, which can be stressed on the inside of the casing formed by the annular tensioning members and can be tensioned with respect to the pressure casing.

The radial tensioning elements can be anchored relative to the outer circumference of the pressure casing; they may, however, also be anchored within the pressure casing and adapted to be tensioned from the inside of the container. This provides the further possibility of staggering the radial tensioning members in accordance with their length and corresponding to the thickness of the pressure casing.

The radial tensioning members that are disposed in horizontal layers are in this connection each passed through two horizontal layers of concentric annular tension members and are connected therewith as well as with any further annular tensioning members arranged symmetrically thereto in layers disposed above and below for tension transmission in a radially outwardly extending direction.

The annular tensioning members which are held in groups in the region of one each radial tensioning member are separated from one another by spacers which, as the radial tensioning member is tensioned, transmit the forces that act outwardly from the anchoring which engages the innermost annular tension members, to all annular tension members.

Small plates are provided as spacers which follow the curvature of the tensioning members and which are provided with at least one bore for threading them onto one or more radial tensioning members and with circumferentially extending grooves for receiving the annular tensioning members.

Finally, the outer pressure casing may be constructed with prefabricated concrete components.

The particular advantage of the new pressure container resides in the fact that the prestressing forces are stored in an outer pressure ring, which is the integrating component of the entire container. In this manner the core is eliminated which was required as the counterbearing in the known pressure containers for the radial presses that act outwardly, as well as also the auxiliary structure required for supporting the same. The prestressing of the annular reinforcing armature may be obtained by way of the radial armoring with normal stressing presses they are conventional in stressed concrete construction. Inasmuch as a large number of such presses can be placed along the circumference of the container any eventual omission of individual presses is insignificant in relation to the magnitude of the prestressing that is ultimately imparted.

To this is added the feature that as compared to the expanding of the annular tensioning members from an inner core the forces of compression may be kept smaller where radial tensioning members are employed, because the tensioning is against the hardened concrete and the compacting of the concrete is compensated by the course or path of tension. With the prestressing against a core tensioning forces are lost, i.e., a press force has to be employed that is greater by this amount.

BRIEF DESCRIPTION OF THE DRAWINGS

Further advantages and features of the invention will become apparent from the description of the embodiment illustrated in the accompanying drawings, in which FIG. 2 is a top plan view along line 2–2 in FIG. 1, and FIG. 3 a horizontal section taken along line 3–3 in FIG. 1, FIG. 6 is a detail of the anchoring of the radial tensioning members in the area of the annular tensioning members taken as a vertical section, and FIG. 7 is a detail corresponding to FIG. 6 in horizontal section.

DESCRIPTION OF THE INVENTION

Figure 1:
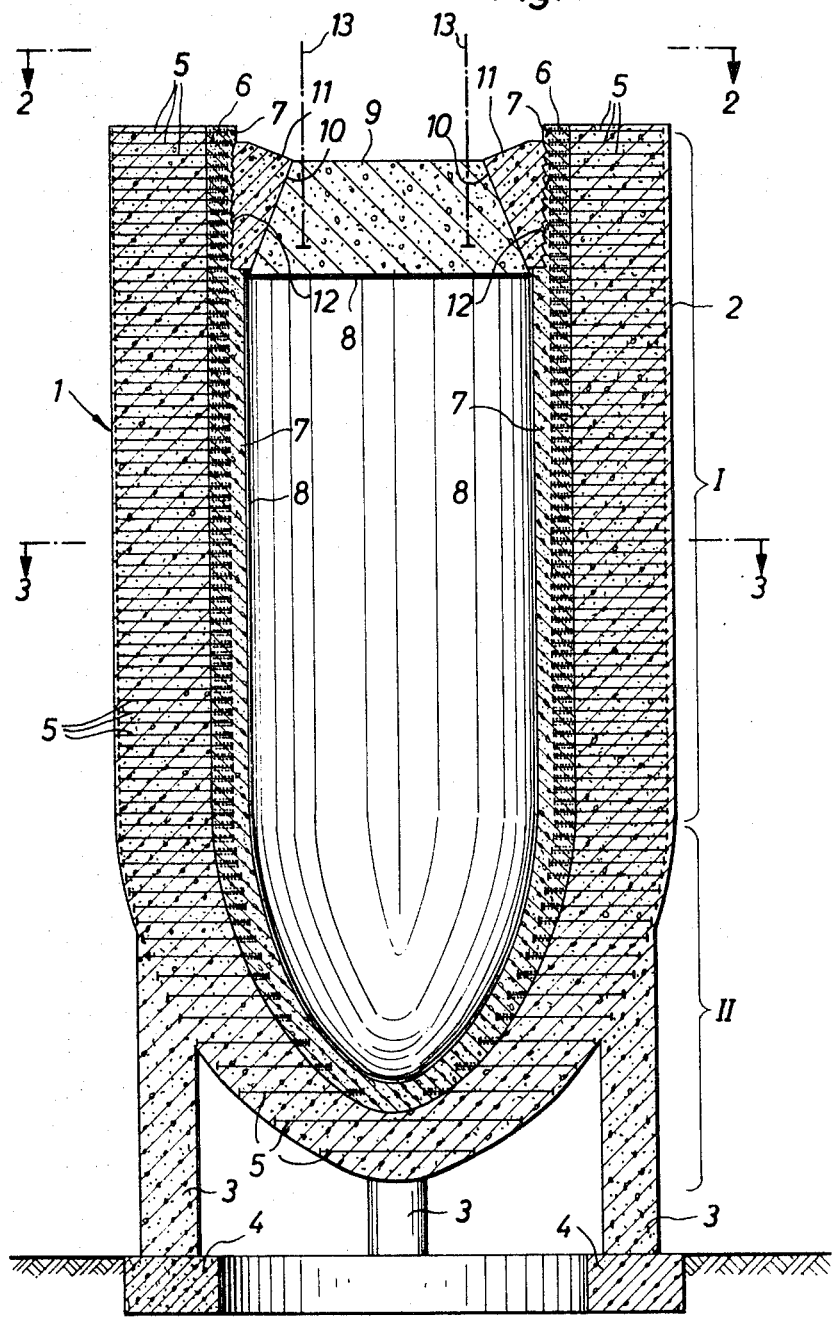
FIG. 1 is a longitudinal section through a pressure container in accordance with the invention.

The pressure container 1 illustrated in FIG. 1 in longitudinal section is constructed in its upper area I as a cylindrical casing having a straight line generatrix and in its lower area II as a curved casing having two axes, which means a curved generatrix. The container proper has a thick-walled outer pressure casing 2 of concrete that is supported by way of supporting legs 3 upon a foundation ring 4.

Radial tension members 5 are arranged in horizontal layers in the outer pressure casing 2, which are connected with annular tensioning members 6 disposed within the outer casing 2 in concentric rings. The annular tensioning members 6 and the ends of the radial tensioning members 5 that extend into their region are dressed or covered with concrete after the tensioning of the annular members 6, thus forming an inner mantle or casing 7. A steel lining 8, which is required for reasons of safe operation, is in engagement with the inner surface of the inner casing 7.

The upper closure of the inner space of the container is defined by a cover 9 consisting of concrete which is of circular construction with an inclined outer surface 10. The space remaining between the cover 9 and the inner wall of the casing 7 is filled by a number of concrete elements or components 11 that are wedge-shaped and constitute a closed ring or annulus, and which at their outer surfaces 12 have a serrated configuration and interengage with correspondingly formed areas of the casing 7. With the inner pressure of the container removed the cover 9 hangs from suspension members 13 on a support structure (not shown). As the inner pressure of the container is applied against the inside of the cover 9 that is likewise provided with a steel lining 8', the cover is pressed in the manner of a wedge with its inclined outer surface 10 against the correspondingly shaped surfaces of the structural components 11, so that a sealing effect is obtained for the cover which depends on the inner pressure.

The embodiment described above of a pressure container constructed in accordance with the invention constitutes only one of numerous embodiments possible. Thus, the pressure container may also be constructed over its entire height with a straight line generatrix, and the bottom plate which then is necessary and the upper cover plate may be shaped in any desired manner. What is necessary for the invention is merely the arrangement of the tensioning members for introducing and maintaining the annular prestressing of the container such as described in detail hereinafter.

Figure 4:
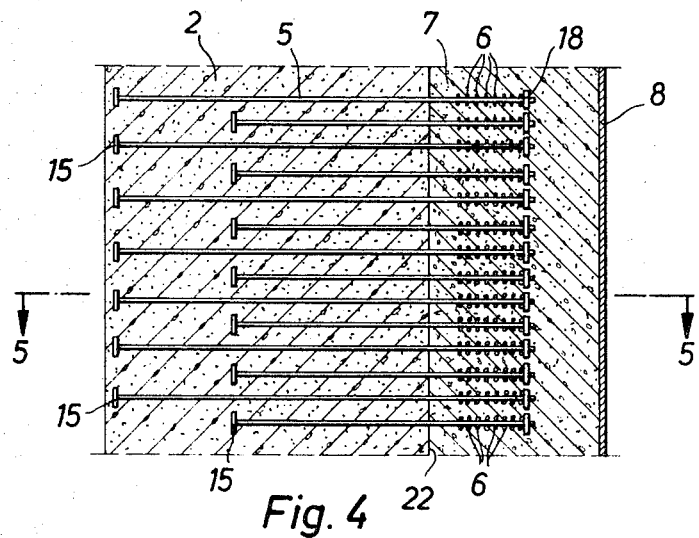
FIG. 4 is a section taken from a longitudinal section through the wall of the container in FIG. 1, to an enlarged scale.

As reflected in detail by FIGS. 4 and 6 the radial tensioning members 5 are disposed in horizontal layers where they are each passed through between two subsequent horizontal layers of annular tension members 6. As already mentioned the racial tensioning members 5 are arranged for longitudinal movement in the area of the pressure casing 2, which is achieved in that they are either introduced in prepared channels or are disposed in casing sleeves 14 over their entire length. In the embodiment illustrated the tensioning members 5 are steel rods which are provided with threads at the ends and anchored in the pressure casing 2 by means of known anchoring elements 15 and an anchoring nut 16.

At the opposite inner end the radial tension members 5 are anchored by means of a anchoring nut 17 against an anchoring block 18 which rests against the innermost annular tension member or members 6. The remaining annular tension members 6 are held at a distance from one another by spacers 19. The spacers 19 correspond essentially in their shape to the curvature of the annular tension members 6; like the anchoring block 1 they each have a central bore 20 in order to be threaded on the radial tension members 5, and along their curved side surfaces they have recesses in the form of grooves to receive and fix the annular tension members 6 firmly in place.

The construction of the container in accordance with the invention is effected essentially as follows:

First the outer thick wall pressure casing 2 is constructed on the prepared foundation. This can be effected by means of a climbing shell with concrete provided in situ or by assembling the pressure shell in rings of prefabricated concrete components. In this connection the individual rings may be composed of prefabricated parts in the form of sectors from which pressure resistant rings are formed by concreting the radial gaps or spaces between the individual prefabricated components.

The radial tension members 5 and the annular tension members 6 are already introduced during the construction of the pressure casing 2 from the bottom upwardly somewhat displaced in height. If the container 2 is concreted in situ, the radial tension members 5 are maintained for longitudinal movement by passing them through tubular sleeves 14. This form of construction is illustrated more in detail in FIGS. 6 and 7. If the pressure casing 2 is made of prefabricated parts, the radial tension members 5 are introduced into prepared channels in a manner known per se.

Subsequently the inner steel lining 8 is built in. It must be at a certain distance from the annular tensioning members for technical and assembly reasons, for example welding of individual metal sheets and testing of the welded seams by Roentgen rays. Correct spacing can be assured by spacers.

The annular tensioning members 6 are now tensioned by tensioning the radial tensioning members 5 with respect to the pressure casing 2, while at the same time annular pressure forces are produced in the outer wall of the pressure casing 2 by way of the anchor members 15 of the radial tension members 5. Subsequently the gap or space between the inside of the pressure casing 2 and the steel casing 8 is concreted or filled with grouting.

Figure 5:
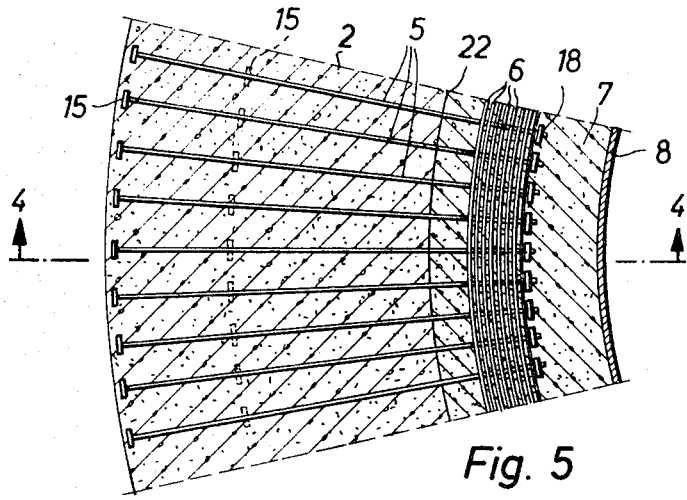
FIG. 5 is the corresponding horizontal section along line 5–5 in FIG. 4.

The prestressing pressure of the pressure casing 2 thus is obtained by tensioning the radial tension members 5 and by expanding the concentric rings formed by the annular tension members 6. Besides the possibility described in connection with FIGS. 1, 6 and 7, of tensioning the radial members 5 from the outside of the pressure casing 2, where the tensioning or stretching presses act on the anchoring elements 15 and the cavities necessary for this have to be closed subsequently, there exists also the possibility of firmly enconcreting the radial tension members 5 at their outer ends with the same anchoring elements 15 or similar anchor members and to apply the tension from the inside. In that case the stressing presses act against the anchoring blocks 18 while the tension introduced by the stretching of the radial members 5 is fixed by turning up the nut 17. This manner of tensioning the radial tension members 5 provides the possibility of staggering them longitudinally with respect to the thickness of the pressure casing and thus economize in material. This possibility is indicated in FIGS. 4 and 5.

In order to arrive at the ultimate static system, i.e., to obtain a container that is prestressed in annular direction, two possibilities exist. One is to release a part of the tensioning forces imparted in the radial tension members 5 after the hardening of the concrete of the inner casing 7 in the space between the pressure casing 2 and the steel casing 8. In this manner the annular pressure force in the pressure casing 2 is reduced and a corresponding annular pressure force is developed in the inner casing by transferring the tension forces. This causes a radial expansion of the pressure casing 2, and the inner casing 7 is subjected to a radial compression. As a result there may develop an open gap 22 (FIG. 6) between the inner casing 7 and the inner wall of the pressure casing 2 into which cement mortar is injected after the destressing operations.

In the event that sufficient time is available for producing the pressure container the destressing of the radial tension members 5 which requires considerable labor expense can be waived. In that event a concrete is used for the pressure casing 2 the composition of which has a considerable creeping tendency. After the annular tension members 6 are stressed by means of the radial tension members 5 the space or gap between the inner wall of the pressure casing 2 and the steel casing 8 is concreted. The transfer of one part of the annular pressure forces from the pressure casing 2 to the inner casing 7 then is obtained by the different creeping and shrinking reaction of the two adjoining parts. Inasmuch as experience has shown that there is a relatively long period of time between the construction of the outer pressure shell or casing and the starting of the operation of the container, one can anticipate that a large part of the annular compression forces will have been transferred by the time the operation is initiated.

It is of considerable importance that the inner casing 7 is not prestressed to the same extent as the outer casing 2 because the former is extremely heavily armored by the annular tension members 6. Even if the inner casing 7 should suffer a few individual hair gaps when the full loads of the inner forces of compression are applied, one need not be concerned about the container developing leakage, because the inner steel casing 8 is provided to insure absolute density.

Having now described the invention with reference to the embodiments illustrated in the drawings, what I desire to protect by Letters Patent is set forth in the appended claims.

I claim:
1. Pressure container of prestressed concrete, particularly for an atomic pile or nuclear reactor, said container having an essentially circular cross section, and comprising a heavy walled pressure casing made of concrete, a plurality of annular stressing elements disposed in spaced relation to and proximate one surface of said casing, embedded in concrete in radially prestressed condition, said annular stressing elements being arranged in concentric rings inside said pressure casing, and a plurality of generally radially extending radial tensioning elements disposed in said pressure casing transversely of said annular stressing elements and longitudinally movable relative to said casing for tensioning said annular stressing elements, said radially extending elements engaging inside of a casing area occupied by said annular stressing elements and being adapted to be stressed with respect to said pressure casing.

2. Pressure container in accordance with claim 1, where said radial tensioning elements are anchored for stressing proximate the outer circumference of said pressure casing.

3. Pressure container in accordance with claim 1, where said radial tensioning elements are securely anchored in said pressure casing and adapted to be stressed from the inside of said container.

4. Pressure container in accordance with claim 3, where said radial tensioning elements are staggered in accordance with their length in relation to the thickness of said pressure casing.

5. Pressure container in accordance with claim 1, comprising said radial tensioning elements arranged in horizontal layers each between two horizontal layers of concentric annular stressing elements and connected thereto for radially outward pull.

6. Pressure container in accordance with claim 5, comprising annular stressing elements disposed in groups proximate radial tensioning members having spacers therebetween and an anchoring block proximate each innermost annular stressing element operative during tensioning to transfer the outwardly effective forces of the radial tensioning members to the annular tensioning elements associated with the radial tensioning member.

7. Pressure container in accordance with claim 6, where said spacers are discs having a curvature following the curvature of said rings and having at least one bore for receiving a radial tensioning member and having grooves extending in the direction of the circumference for accommodating said annular stressing elements.

8. Pressure container in accordance with claim 7, where said pressure casing is constituted by prefabricated concrete components.

9. Pressure container in accordance with claim 1, constructed with reference to a generally linear generatrix.

10. Pressure container in accordance with claim 1, constructed at least partly with reference to a generally curvilinear generatrix.